Jan. 9, 1940.　　　E. R. HOLLOWAY　　　2,186,108
TRANSMISSION
Filed Nov. 19, 1937　　　2 Sheets-Sheet 1

INVENTOR
Edw. R. Holloway.
By Eugene H. Simpson
ATTORNEY

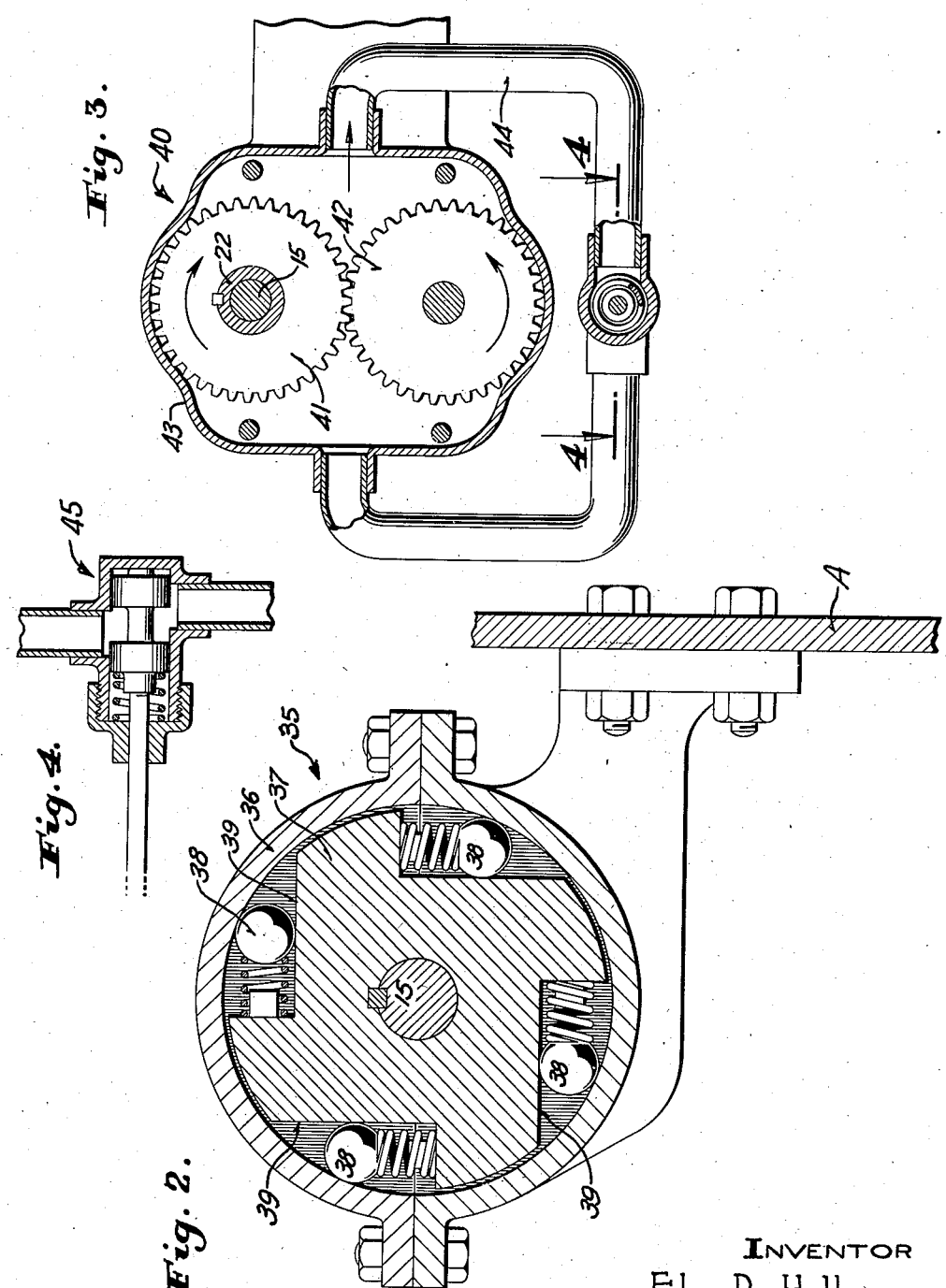

Patented Jan. 9, 1940

2,186,108

UNITED STATES PATENT OFFICE 2,186,108

TRANSMISSION

Edward R. Holloway, Waukesha, Wis.

Application November 19, 1937, Serial No. 175,411

22 Claims. (Cl. 74—293)

This invention relates to transmissions and more particularly to a mechanism adapted to transmit power between a driving and a driven shaft.

One object of the present invention is to produce a power transmission which will give an infinite number of power ratios between two definite limits.

Another object is to produce a power transmission for an automobile or the like, which will eliminate the gear shift lever in the automobile.

A further object is to produce a hydraulically controlled power transmission which will operate between set limits to give an infinite number of speed-power ratios.

A further object is to produce a power transmission which is simple to operate, inexpensive to manufacture, and economical to use.

Other objects will become apparent upon considering the following specification.

A structure embodying the invention is illustrated in the accompanying drawings and will be hereinafter fully described, the invention residing in certain novel features which will be particularly pointed out in the appended claims.

In the drawings:

Fig. 2 is a cross-section on the line 2—2 of Fig. 1, showing an over-riding clutch which may be used in connection with the invention;

Fig. 3 is a cross-section on the line 3—3 of Fig. 1, showing the details of the oil pump; and Fig. 4 is a cross-section on the line 4—4 of Fig. 3, showing the oil pump control valve.

Figure 1:
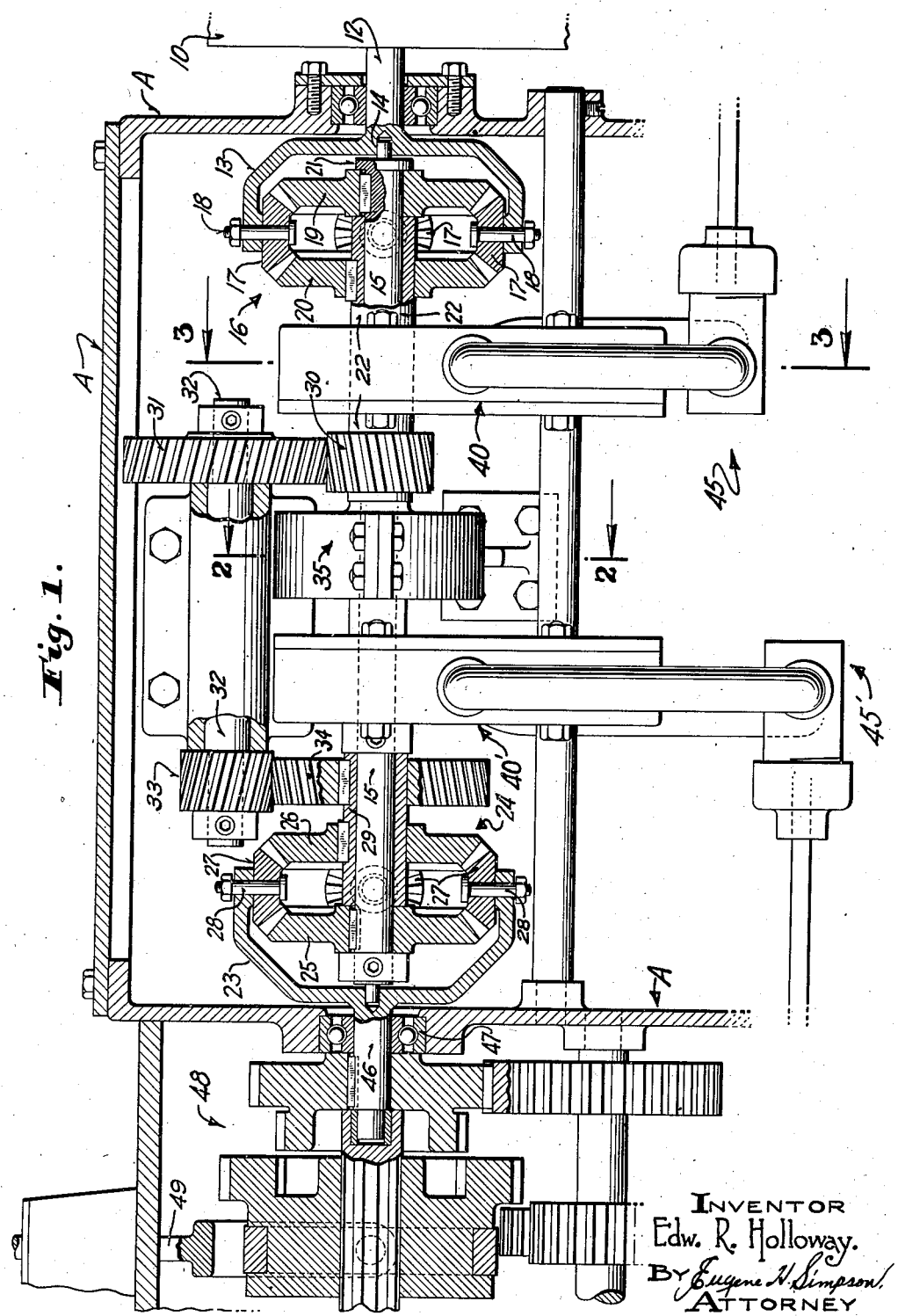
Fig. 1 is a cross-section through the transmission showing the arrangement of gears.

Referring to the drawings in which like numerals indicate like parts throughout the several views, the power transmission, shown in Fig. 1, is housed in a transmission casing A, and receives power from an engine 10, of which one end only is shown, through a power shaft 12.

The power shaft 12 projects through the casing A and may have a gear housing 13 formed on its inner end.

The gear housing may have a bearing 14 formed therein concentric with the power shaft 12 to rotatably receive the power end of a transmission shaft 15.

The gear housing partially encloses a power differential, generally designated 16, which includes a plurality of idler gears 17 each rotatably mounted on a pin 18 and spaced about the inner periphery of the housing 13. The idler gears each engage both of two driven gears 19 and 20 and rotate one or both of the driven gears 19 and 20, depending on the comparative resistance offered by the driven gears.

The driven gear 19 is keyed on the transmission shaft 15 and is held in position thereon between a shoulder 21 formed on the shaft 15, and a sleeve 22 rotatably mounted on the shaft.

The driven gear 20 is keyed on the sleeve 22 so that as the driven gear 19 turns the shaft 15, the driven gear 20 rotates the sleeve 22 either at the same or at a different speed, the difference of speed between the gears 19 and 20 being taken up by rotation of the idler gears 17 about their axes 18.

The driving end of the transmission shaft 15 is mounted in a gear housing 23 which houses a driving differential, generally designated 24.

The differential 24 is composed of a pair of driven gears 25 and 26 and a plurality of idler gears 27 each of which is in mesh with both of the driven gears 25 and 26. The idler gears 27 are each mounted on pins 28 spaced about the inner periphery of the housing 23 so that the idler gears 27 are free to turn on the pins 28, and to rotate with the housing.

The driven gear 25 is keyed on the driving end of the transmission shaft 15, and therefore is turned by the driven gear 19 and at the same speed as the gear 19.

The driven gear 26 is fixed on a sleeve 29, which has a running fit on the driving end of the transmission shaft 15. The sleeves 22 and 29 form hollow shafts which rotate with the gears 20 and 26 and transmit power therefrom or thereto.

The sleeve 29 is rotated on the transmission shaft 15 by a series of reduction gears comprising a pinion 30 keyed on the sleeve 22, which drives a gear 31 fixed on a counter-shaft 32, and a pinion 33 keyed on the counter-shaft which drives a gear 34 fixed on the sleeve 29. While the gearing is designed to reduce the speed of the gear 26 relative to the gear 20, it is to be understood that the gears 30, 31, 33, 34 can be designed to increase the speed of the gear 26 relative to the gear 20 without departing from the spirit of the invention.

When the power shaft 12 is turned the gear housing 13 is rotated which tends to drive both the driven gears 19 and 20. Due to the reduction gearing between the gears 20 and 26, the driven gear 20 will offer less resistance to turning than the gear 19. The idler will, therefore, have a tendency to drive the gear 20 in the same direction as the power shaft and the gear 19 in the opposite direction.

In order to prevent this reverse rotation of gear 19, a one-way brake, generally designated 35, is placed on the transmission shaft 15, which prevents reverse rotation of the transmission shaft or the gears 19 and 25 carried thereby.

The details of the brake 35 are best shown in Fig. 2. Referring to that figure, it will be seen that the brake 35 comprises a casing 36 fixed to the casing A, and a rotor unit 37 fixed to the shaft 15. A plurality of spring pressed balls 38 operate on wedge surfaces 39 to permit clockwise rotation, as seen in Fig. 2, and to prevent counter-clockwise rotation.

A circulating oil pump, generally designated 40, is connected to be driven by the sleeve 22, the details of the pump being shown in Fig. 3. Referring to that figure, the pump comprises a gear 41 keyed on the sleeve 22, and in mesh with a second gear 42. The gears 41 and 42 are enclosed in a casing 43, which fits closely against the gears so that oil is pumped between the casing 43 and the spaces between gear teeth. The oil is pumped out through an exhaust pipe 44 and through a valve 45, best shown in Fig. 4.

Varying the closure of the valve varies the head pumped against and hence varies the resistance on the sleeve 22. By suitably varying the resistance on the sleeve 22 the relative speeds of the gears 19 and 20 may be varied and an infinite number of speeds thus obtained between the ratio of the reduction gears 30—34 to a direct drive when the sleeve 22 is stopped.

The oil pump 40 may be replaced by a friction brake if desired, the important feature being the ability to vary the torque on the sleeve 22.

A second oil pump or friction brake 40' may be placed on the transmission shaft 15 to form an auxiliary brake for the machine.

The gear housing 23 is connected to rotate on a drive shaft 46 which may be mounted in a suitable bearing 47.

The drive shaft connects with the main shaft leading to the member to be driven through a conventional gearing 48 adapted to give a forward, reverse or idling position. The gearing 48 is shown in neutral position with a gear shift lever 49 extending upwardly to effect a change from neutral to forward or reverse.

Having thus described the invention, it will be apparent that many changes can be made in the same such, for example, as changes in the types of gears, or brakes, which do not involve invention. It is not, therefore, desired to limit the invention to the precise form herein shown and described but only by the scope of the appended claims.

Having thus described the invention it is hereby claimed as follows:

1. A transmission of the character described comprising, a first differential gear, a second differential gear, a shaft, means fixing one unit of the first differential on said shaft, means connecting one unit of the second differential on said shaft to transmit rotation between said units, means connecting another unit of said first differential with a unit of said second differential to transmit rotation from the first differential unit to the second differential unit at a reduced speed.

2. A transmission of the character described comprising, a shaft, a first sleeve rotatably mounted on said shaft, a second sleeve rotatably mounted on said shaft, a first differential including, a first driven gear fixed on said shaft to rotate therewith, a second driven gear fixed on said first sleeve to rotate therewith and a plurality of freely rotatable idler gears in mesh with said first and second driven gears, means to rotate said idler gears about the axis of said shaft to drive said driven gears, a second differential including, a third driven gear fixed on said shaft, a fourth driven gear fixed on said second sleeve and a second plurality of freely rotatable idler gears in mesh with said third and fourth driven gears to be driven thereby, means to drive said fourth driven gear from said second driven gear and at a different speed therefrom, and means rotatably mounting said second plurality of idler gears to receive the power therefrom.

3. A transmission as defined in claim 2 including a one-way brake on said shaft between said driven gears to insure the shaft turning in one direction only.

4. A transmission as defined in claim 2 including means to regulate the speed of said second driven gear independently of the speed of the shaft.

5. A transmission as defined in claim 2 including means to regulate the speed of the shaft independently of the speed of the sleeves.

6. A transmission of the character described comprising, a power shaft, a driven shaft coaxial with said power shaft, a first gear housing connected to said power shaft to rotate therewith, a second gear housing connected to said driven shaft to rotate therewith, a transmission shaft mounted between said power shaft and said driven shaft, a first sleeve mounted to rotate on said transmission shaft adjacent said power shaft, a second sleeve mounted to rotate on said transmission shaft adjacent said driven shaft, a first differential mounted in said first housing, said differential comprising a first driven gear connected to said transmission shaft to rotate therewith, a second driven gear connected to said first named sleeve to rotate therewith and a plurality of idler gears mounted in said first housing to rotate about their axes and about the axis of said power shaft and in mesh with both of said driven gears, a second differential mounted in said second housing, said second differential comprising a third driven gear connected to said transmission shaft to rotate therewith, a fourth driven gear connected to said second sleeve to rotate therewith and a plurality of idler gears mounted in said second housing in mesh with both said third and fourth driven gears and adapted to rotate about their own axes and about the axis of said driven shaft to transmit power from said driven gears to said second housing; and means to drive the second sleeve from the first sleeve at a different speed therefrom.

7. A transmission as defined in claim 6 in which the last named means comprises a pinion mounted on said first sleeve to rotate therewith, a gear mounted on said second sleeve to rotate therewith, a countershaft parallel to said transmission shaft, a gear mounted on said countershaft to turn therewith and in mesh with the pinion on said first named sleeve, and a pinion mounted on said countershaft to turn therewith and in mesh with the last named gear on said second sleeve.

8. A transmission as defined in claim 6 including a one-way brake on said transmission shaft to insure the shaft turning in one direction only.

9. A transmission as defined in claim 6 including means on one of said sleeves to regulate the speed thereof.

10. A transmission as defined in claim 6 including a circulating liquid pump driven by one of said sleeves, and means to limit the output of said pump to regulate the speed of said sleeves.

11. A transmission of the character described comprising, a power shaft, a driven shaft coaxial with said power shaft, a first gear housing connected to said power shaft to rotate therewith, a bearing mounted in said first gear housing concentrically therewith, a second gear housing connected to said driven shaft to rotate therewith, a bearing mounted in said second gear housing concentrically therewith, a transmission shaft mounted in said bearings to rotate therein, a first sleeve mounted to rotate on said transmission shaft adjacent said power shaft, a second sleeve mounted to rotate on said transmission shaft adjacent said driven shaft, a first differential mounted in said first housing, said differential comprising a first driven gear connected to said transmission shaft to rotate therewith, a second driven gear connected to said first named sleeve to rotate therewith and a plurality of idler gears mounted in said first housing to rotate about their axes and about the axis of said power shaft and in mesh with both of said driven gears, a second differential mounted in said second housing, said second differential comprising a third driven gear connected to said transmission shaft to rotate therewith, a fourth driven gear connected to said second sleeve to rotate therewith and a plurality of idler gears mounted in said second housing in mesh with both said third and fourth driven gears and adapted to rotate about their own axes and about the axis of said driven shaft to transmit power from said driven gears to said second housing, and means to drive the second sleeve from the first sleeve at a different speed therefrom.

12. A transmission as defined in claim 11 including a one-way brake on said transmission shaft to insure the shaft turning in one direction only.

13. A transmission as defined in claim 11 including means on one of said sleeves to regulate the speed thereof.

14. A transmission as defined in claim 11 including a circulating liquid pump driven by one of said sleeves, and means to limit the output of said pump to regulate the speed of said sleeves 15. A transmission of the character described comprising, a first shaft, a second shaft alined with said first shaft at one end thereof, a third shaft alined with said first shaft at the opposite end thereof, a first differential comprising, a first gear mounted on said first shaft to turn therewith, a second gear mounted on said second shaft to turn therewith, and a plurality of idler gears meshed with both said first and second gears, a second differential comprising, a third gear mounted on said first shaft to turn therewith, a fourth gear mounted on said third shaft to turn therewith, and a plurality of idler gears in mesh with both said third and fourth gears, means to transmit power between said second and third shafts, means to supply power to one set of idler gears, and means to receive power from the other set of idler gears.

16. A transmission as defined in claim 15 including a one-way brake on said first shaft between said first and third gears to insure the shaft turning in one direction only.

17. A transmission as defined in claim 15 including means to regulate the speed of said second shaft.

18. A transmission as defined in claim 15 including means to control the speed of said first shaft.

19. A transmission as defined in claim 15 including a circulating pump mounted on said first named shaft to control the speed thereof.

20. A transmission as defined in claim 15 including a circulating pump mounted on said second shaft to control the speed thereof.

21. A transmission as defined in claim 15 including a circulating pump connected with said first shaft and a circulating pump on said second shaft.

22. A transmission of the character described comprising, a first shaft, a second shaft alined with said first shaft at one end thereof, a third shaft alined with said first shaft at the opposite end thereof, a first differential comprising, a first gear mounted on said first shaft to turn therewith, a second gear mounted on said second shaft to turn therewith, and a plurality of idler gears meshed with both said first and second gears, a second differential comprising, a third gear mounted on said first shaft to turn therewith, a fourth gear mounted on said third shaft to turn therewith, and a plurality of idler gears in mesh with both said third and fourth gears, a countershaft parallel to said first shaft and means to transmit power from said second shaft to said third shaft through said countershaft, means to supply power to one set of idler gears, and means to receive power from the other set of idler gears.

EDWARD R. HOLLOWAY.